(12) United States Patent
Koning et al.

(10) Patent No.: US 6,863,235 B2
(45) Date of Patent: Mar. 8, 2005

(54) MECHANICAL SHIFTING OF MULTI-LOAD RETRACTOR

(75) Inventors: Richard W. Koning, Yale, MI (US); Kenneth H. Kohlndorfer, Roseville, MI (US); Mark F. Gray, Sterling Heights, MI (US); Michael J. Moore, Attica, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 76 days.

(21) Appl. No.: 10/303,413

(22) Filed: Nov. 25, 2002

(65) Prior Publication Data

US 2003/0132334 A1 Jul. 17, 2003

Related U.S. Application Data

(60) Provisional application No. 60/349,785, filed on Jan. 17, 2002.

(51) Int. Cl.$^7$ .............................................. B75H 75/48
(52) U.S. Cl. ...................... 242/379.1; 280/805; 280/806
(58) Field of Search ........................ 242/379.1; 280/805, 280/806; 180/268, 269, 270; 297/470, 471, 472

(56) References Cited

U.S. PATENT DOCUMENTS

| | | | | |
|---|---|---|---|---|
| 5,799,893 A | * | 9/1998 | Miller et al. ............. | 242/379.1 |
| 5,967,441 A | * | 10/1999 | Kohlndorfer et al. ..... | 242/379.1 |
| 6,241,172 B1 | | 6/2001 | Fugel et al. ............. | 242/379.1 |
| 6,312,806 B1 | | 11/2001 | Tang et al. ................. | 428/364 |
| 6,648,260 B2 | * | 11/2003 | Webber et al. ........... | 242/379.1 |
| 6,685,124 B2 | * | 2/2004 | Frank ......................... | 180/268 |
| 2001/0037907 A1 | | 11/2001 | Peter et al. | |

FOREIGN PATENT DOCUMENTS

| | | |
|---|---|---|
| DE | 19546731 | 6/1997 |
| DE | 19927731 | 12/2000 |
| DE | 20019468 | 5/2001 |
| GB | 2371780 | 8/2002 |

* cited by examiner

*Primary Examiner*—William A. Rivera
(74) *Attorney, Agent, or Firm*—Markell Seitzman

(57) ABSTRACT

A seat belt retractor (20) comprising: a primary (40) and secondary (60) locking mechanism and deactivation mechanism (74) for mechanically deactivating the second locking mechanism (60) when the retractor is used by occupants not in a designated class; the retractor including at least two load limiting mechanisms including for example, a torsion bar and variable elongation webbing or a torsion bar and a friction brake (or clutch) configured to be selectively employed depending on the size of the occupant.

16 Claims, 7 Drawing Sheets

MECHANICAL SHIFTING OF MULTI-LOAD RETRACTOR

This is a regularly filed utility patent application claiming priority of provisional patent application No. 60/349,785, filed Jan. 17, 2002.

BACKGROUND AND SUMMARY OF THE INVENTION

The present invention generally relates to seat belt retractors having energy-absorbing or dissipating mechanisms and more particularly to a multi-level energy absorbing or dissipating system, which is also referred to as a multi-level load limiting system. The system includes a device for shifting the output characteristic of the retractor from one load level limit (energy dissipation) to another load level limit (energy dissipation) based on operational parameters.

Torsion bars have for decades been proposed for use in seat belt retractors. As the torsion bar is twisted during a vehicle emergency, the retractor output, that is the force displacement (force rotation) characteristic of the torsion bar quickly reaches a saturated region, which corresponds to its plastic range of operation. This generally constant characteristic provides a reaction force or load on the seat belt that may not be adequate to protect occupants of differing sizes. Consequently, it is desirable to provide a seat belt system with more than one load-limiting characteristic. As the torsion bar is twisted crash energy is absorbed (dissipated).

The prior art illustrates seat belt retractors having two dissimilar and remotely located torsion bars to achieve a multi-level of load limiting, while other prior retractors use a single torsion bar that is sub-divided into two torsion bar portions to achieve multi-level load limiting operation.

The present invention utilizes, in the illustrated embodiments, a single torsion bar to achieve a first level of load limiting under certain operating conditions and includes a mechanism to disable the torsion bar during other operating conditions. To achieve the desired second level of load limiting a variable elongation seat belt webbing is used. One such webbing is shown in U.S. Pat. Nos. 5,830.811 and 6.228,488, which are incorporated herein by reference.

A typical woven seat belt displays a generally determinable elongation rate in the range of about 8–12 percent. For any seat belt the elongation does not change appreciably when it is loaded and operating in its elastic mode. The variable elongation seat belt referred to above has an elongation rate that varies with the applied load. For example, at applied belt forces or loads of 4–5 kilo-Newtons the elongation rate is approximately 6–8 percent. As the load increases, the seat belt becomes more slack and its elongation rate increases to approximately 12–14 percent. The increased elongation rate, that is, the increased stretchiness of the belt permits the occupant to move forward during a crash, as crash energy is absorbed by the belt. As the seat belt stretches crash energy is dissipated.

The classic seat belt retractor only offers a modest degree of energy absorption, which occurs as the seat belt stretches as it is loaded by the occupant during an emergency.

A newer class of seat belt systems has incorporated various types energy-absorbing mechanisms including crush bushings and torsion bars, which permit the seat belt spool and hence the webbing (wound thereabout) to protract in a controlled manner. In this type of system, the applied force generated by the occupant is resisted by a controlled force created as the torsion bar twists. As the torsion bar twists, crash energy is absorbed or dissipated; additionally the controlled amount of the seat belt protracted from the spool lessens the likelihood of occupant injury.

It is an object of the present invention to provide a multi-level energy-absorbing seat belt retractor.

The present invention advantageously utilizes the combination of the characteristics of the torsion bar and the variable elongation webbing to provide a multi-level seat belt load limiting system. In other embodiments the energy-absorbing (energy-dissipating) characteristics of the torsion bar are replaced by a friction mechanism while still using the variable elongation webbing.

Many other objects and purposes of the invention will be clear from the following detailed description of the drawings.

DETAILED DESCRIPTION OF THE DRAWINGS

Figure 1:
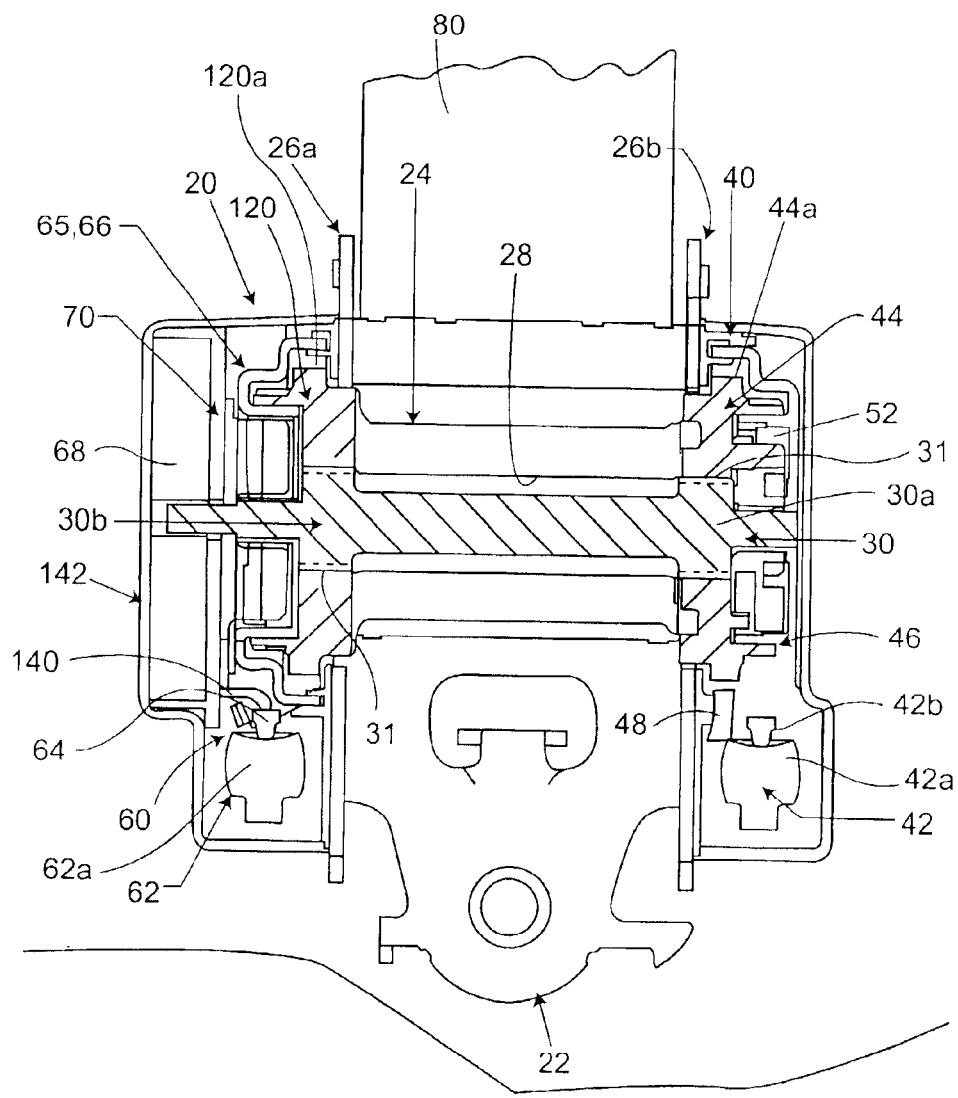
FIG. 1 is a cross-sectional view, which diagrammatically illustrates many of the major components of the first embodiment of the invention.
Figure 2:
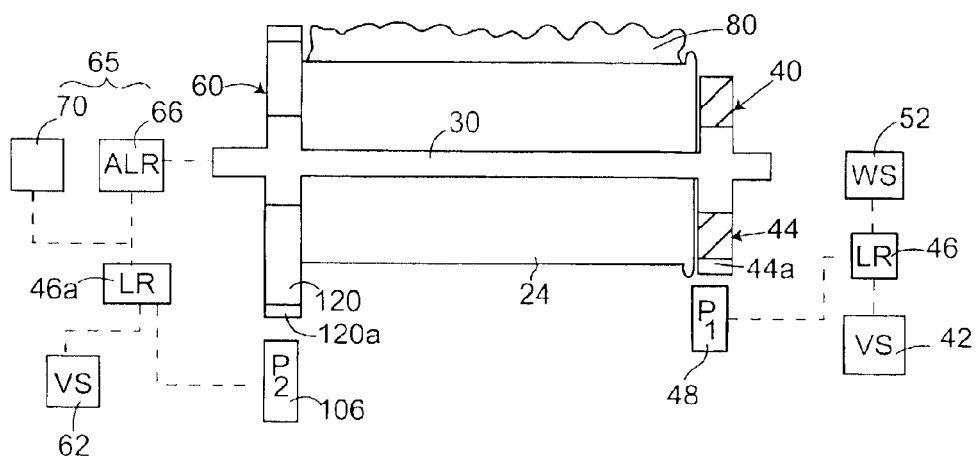
FIG. 2 is a systems block diagram, which corresponds to the retractor shown in FIG. 1.

Reference is made to FIGS. 1 and 2, which show the major components of a seat belt retractor 20 incorporating the present invention. The present invention is suited for use in all retractors in any seating position and is particularly well suited for retractors for seating positions not associated with air bags. These components include a frame 22 upon which a spool 24 is rotatably mounted on sides 26a and 26b of the frame 22. The spool includes a central passage 28 for receipt of a torsion bar 30. In this embodiment the torsion bar also acts as the spool shaft.

Figure 3:
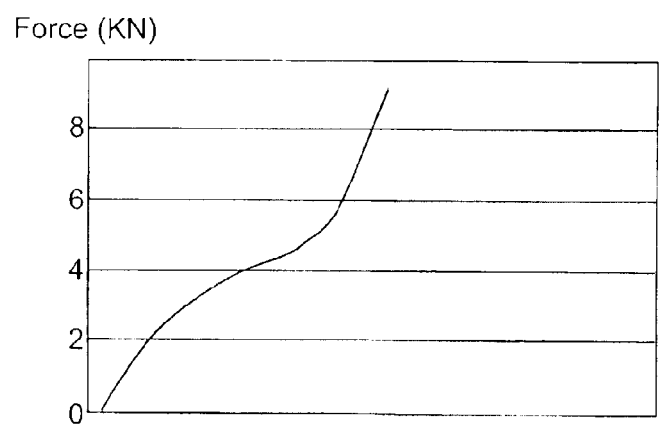
FIG. 3 shows the force displacement curve for the variable elongation webbing incorporated in the retractor.

As will be seen the retractor 20 is an ELR retractor with an optional ALR switching mechanism. As is known ELR stands for emergency locking retractor and ALR stands for automatically locking retractor. The retractor includes a first or primary locking mechanism 40 operatively connected to one side 30a of the torsion bar and a secondary locking mechanism 60 operatively connected to the side 30b of the torsion bar. A quantity of seat belt webbing 80 is mounted or rotated onto the spool 24. A seat belt system using the present retractor will include a tongue, which is mounted to the seat belt and a buckle in which the tongue can be locked in place. The seat belt webbing 80, in the preferred embodiment, has a variable elongation characteristic, which is a function of applied force as shown in FIG. 3. The specific elongation characteristics of the webbing will vary with its application.

As will be seen from the description below, the seat belt retractor 20 is designed to have two basic modes of operation during an accident when it is operating as an ELR seat belt retractor. These modes of operation correspond to the levels of energy absorption or energy dissipation generated (as used herein energy absorption and dissipation are equivalent). One mode of operation is designed to protect the occupant of larger stature (larger than or equal to the $50^{th}$ percentile male) by restraining the occupant using the characteristics of the load limiting seat belt. In this first mode of operation, both the first and second locking mechanisms 40 and 60 are activated, typically by an inertial crash sensor, thereby locking the spool on both sides. More importantly, the activation of both locking mechanisms 40 and 60 prevents the torsion bar from twisting. Consequently, the energy-absorbing or force-dissipating load characteristics of the retractor are defined by the characteristics of the variable elongation webbing and not the characteristic of the torsion bar. In this example, during an accident, in this mode of operation, the force absorbing characteristics of the seat belt webbing are configured to be greater than those of the torsion bar.

The other ELR mode of operation is entered when the seat belt is used by other classes of occupants having a smaller physical size than the $50^{th}$ percentile male. In this example the occupant size may be the 5th percentile female (in this mode of operation the retractor will also adequately protect the 6 year-old-sized occupant). To enable the seat belt retractor shown in FIGS. 1 and 2 to switch between the energy-absorbing modes of operation based upon occupant size, the retractor includes a mechanical switch 65, which is sensitive to the amount of seat belt that has been removed from the spool (or alternatively the amount of seat belt remaining on the spool) after the occupant has placed the seat belt around his or her body and buckled the tongue within the buckle. This amount of seat belt webbing correlates well to the size of the occupant. This mechanical switch when moved to its blocking position prevents the second locking mechanism from being activated.

More particularly, this mechanical switch will block out its locking pawl so it remains separated from its lock wheel until after a predetermined amount of the seat belt (for example that corresponds to the size of a $50^{th}$ percentile male) has been protracted from the retractor 20. As can be appreciated, this ELR mode of operation is first entered into as webbing is withdrawn from a fully packed retractor. When a sufficient amount of webbing is removed, the ELR mode of operation for the larger sized occupants is then entered. The mechanical switch 65 can generically be realized by modifying known geared mechanisms, which respond to the number of revolutions of the belt shaft or spool.

The first or primary locking mechanism 40 is a conventional locking mechanism and comprises a vehicle sensor 42 (which includes a mass 42a and one or more sensor pawls 42b), a lock wheel 44 (with lock teeth 44a) secured to and rotatable with end 30a of the torsion bar, a lock cup (also known as a lock ring) 46 rotatably disposed about end 30a of the torsion bar and a lock pawl 48 (diagrammatically shown). Various types of locking mechanisms can be utilized. A locking mechanism similar to that described is described in U.S. Pat. No. 5,904,371, which is incorporated herein by reference.

When the vehicle deceleration is above a specified limit the vehicle sensor mass 42 moves, thereby coupling the lock cup (ring) 46 (which was previously not coupled to the spool) to the spool, which then causes the lock cup (ring) to rotate with the spool. The rotary motion of the lock cup causes the lock ring 46 to rotate, which in turn causes the lock pawl 48 to rotate into a locking engagement with the teeth 44a disposed about the lock wheel 44. The primary locking mechanism 40 further includes a web sensing mechanism 52, of known type, which is activated when the spool rotates above a determinable level. One such web sensing mechanism is illustrated in the above-referenced patent. This particular web sensing mechanism, when activated, also couples lock cup 46 to the spool to effect the locking of the spool by moving the lock pawl 48 into place.

Figure 4:
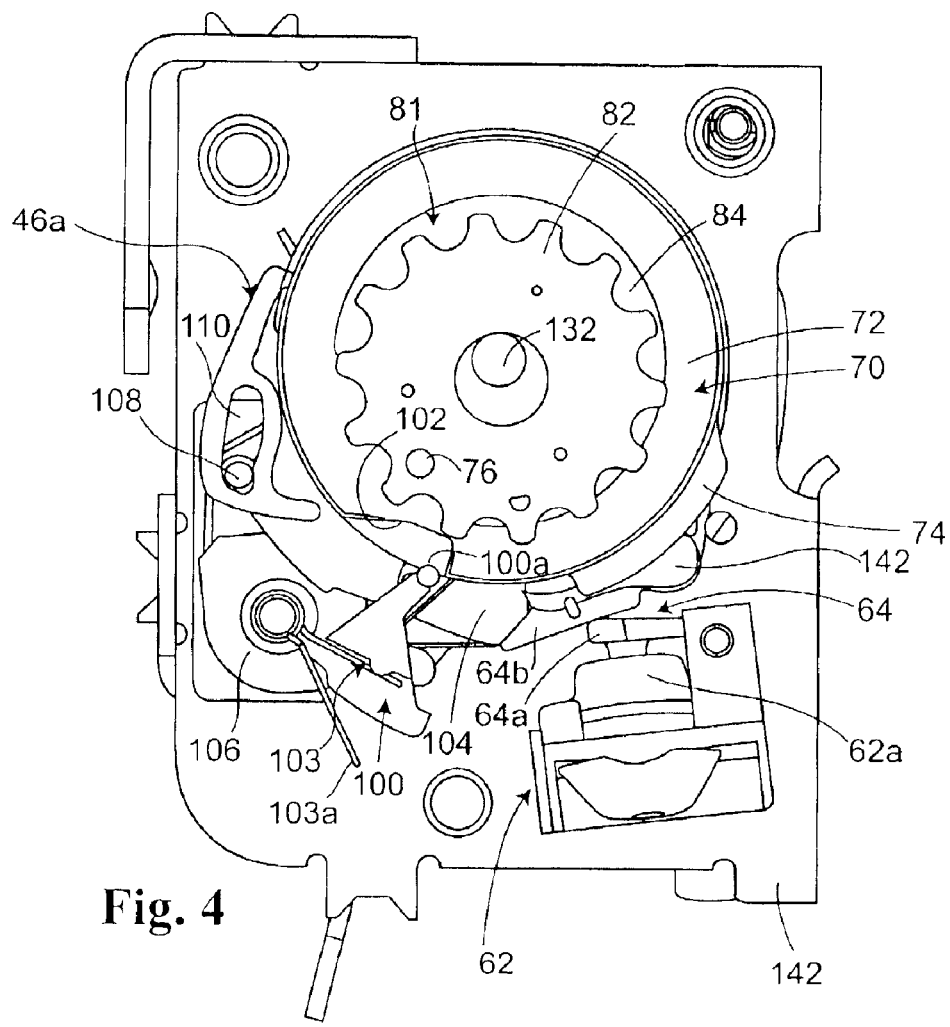
FIG. 4 illustrates a cross-sectional view showing portions of a secondary lock mechanism.

Reference is again made to the secondary locking mechanism 60, which includes another vehicle sensor 62 (sensing mass 62a and a sensing pawl mechanism 64, having two sensing pawls), as illustrated in FIG. 4. The sensing pawls associated with vehicle sensor 42 can be the same as shown for the pawl mechanism 64.

As mentioned above, the present invention includes a mechanical switch 65 responsive to the amount of seat belt withdrawn from the retractor (or alternatively the amount of webbing remaining on the retractor). As is known in the art an ALR mechanism of a seat belt retractor is essentially a mechanical switch, responsive to the rotation of the spool, that is the withdrawal of the seat belt from the spool. As used herein the ALR mechanism is also referred to as switch 66. The ALR mechanism is used to switch the retractor from its ELR mode of operation into its ALR mode of operation. The operation of the ALR mechanism (switch 66) is incidental to the present invention. As known in the art, various ALR mechanisms comprise systems of one or more gears. In the present invention an additional gear, referred to as a switch 70, is added to a known ALR mechanism.

As is known in the art the ALR mode of operation is typically entered into when an operator of a vehicle is securing a child seat to the vehicle seat. The operator, typically an adult, withdraws most if not all of the seat belt from the spool. Upon reaching this condition the retractor switches to a mode of operation in which the retractor spool is always locked. The retractor will revert back to the ELR mode of operation when the seat belt is again fully rewound on the spool by operation of the retraction spring 68. The retractor or rewind spring 68 is coupled to the remote end 30c of the torsion bar 30.

Figure 5:
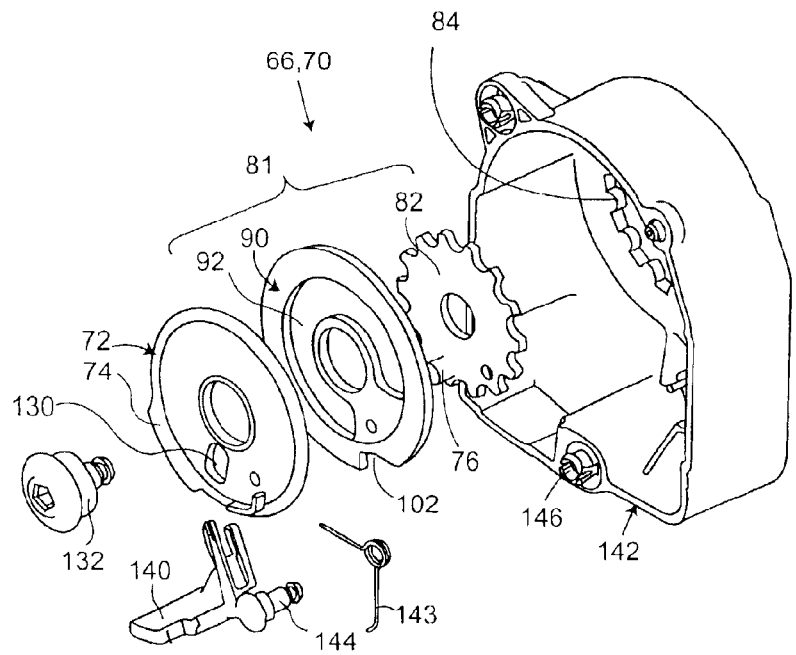
FIG. 5 illustrates further details of the ALR switch 66 and the occupant-sized switch 70.

The added switch 70 is used to block the operation of the second vehicle sensor 62 during those times when the amount of webbing removed from the retractor is less than (or equal to) the amount of webbing normally extracted when an occupant, smaller than a 50th percentile male, is utilizing the seat belt retractor (i.e. the secondary locking mechanism is blocked out for smaller occupants). Reference is made to FIGS. 4 and 5. In the preferred embodiment, this occupant-size switch 70 comprises an additional disk 72 added to the ALR switch mechanism 66. The ALR mechanism 66 and its interaction with other components of a retractor is also described in the above-referenced U.S. Pat. No. 5,904,371.

The disk 72 includes an extending lobe 74, which is rotated by action of one of the mechanisms of the ALR switch and in particular, the pin 76 (which is shown as numeral 122 of the above-referenced patent U.S. Pat. No. 5,904,371). The various mechanisms of the switches 66 and 70 are arranged such that the lobe or cam 74 is positioned atop (directly or indirectly) the sensor pawl mechanism 64 (of the second lock mechanism 60), thereby prohibiting the second vehicle sensor 62 from activating the secondary lock mechanism 60. As an aside, the sensor-pawl mechanism 64 shown in FIG. 4 is a compound sensor mechanism with a first and second lever 64a and 64b (often used in the prior art) however, a single sensor-pawl mechanism is within the scope of the present invention.

The disclosed ALR mechanism is used as a means to an end and is not critical to the present invention. The ALR mechanism or switch 66 comprises a wobble or eccentric gear mechanism 81 driven to rotate with the spool, which includes various gears and disks including a wobble gear 82, an eccentric cam 132 and a fixed ring gear 84 (see FIG. 5), which is molded to a wall of a housing 142. The gear 84 is driven by the cam. The ALR switch 66 operates on a second lock ring 46a (see FIG. 4), which is part of the secondary locking mechanism 60. The lock ring gear 46a is similar to lock ring 46 and under normal operation is rotationally disconnected from the spool and torsion bar.

The ALR switch 66 further includes a cam disk 90, which includes an arcuate slot 92. The post or pin 76 (carried on the eccentric gear 82) is received within the slot 92. As webbing is withdrawn from the spool, the gear 82 moves about the ring gear, the pin moves in a defined orbit and when the pin bottoms out at one of the ends of the slot 92, continued movement of the pin 76 is transferred to the disk 90 and the disk 90 is pushed by pin 76 in a clockwise or counter-clockwise manner, as the case may be. As is known in the art, when virtually all of the seat belt is extracted from the spool (for child seat buckle-up), the cam disk 90 is timed to be positioned adjacent the end 100a (see FIG. 4) of a spring-loaded lever 100, which permits this lever 100 to move within a notch 102 of the cam disk 90 under operation of one leg of spring 103.

The other leg 103a of the spring is held fixed. This rotary motion of the lever 100 pushes a secondary pawl 104 associated with the ring gear 46a into contact with the lock teeth 120a of the lock wheel 120 associated with the secondary lock mechanism 60. This action couples the ring gear 46a to the spool 24. Further motion for the rotation of the spool 24 in a belt-protracting direction causes the lock ring 46a to rotate, which causes a locking pawl 106 of the second lock mechanism 60 (also see FIG. 4) to engage the lock wheel 120. For example, the locking pawl 106 (as does lock pawl 48) includes a cam following pin 108 received within a slot 110 of the lock ring 46a. As the lock ring rotates in a counter-clockwise direction (in relation to FIG. 4), which corresponds to a belt unwinding direction, the second lock pawl 106 is moved into the lock teeth 120 disposed about an end of the spool, thereby locking same. As previously mentioned, this type of mechanism is well known.

In the ELR mode of operation, the secondary operating mechanism 60 will be activated by operation of the vehicle sensor 62. The vehicle sensor 62 includes the vehicle sensor body or mass 62a and the sensor pawl mechanism 64. During an accident, the normal operation of the vehicle sensor is to cause the vehicle sensor pawls 64a and 64b to move upwardly, thereby causing the second lock ring 46a to be coupled to the spool, which in turn causes the second lock pawl 106 to lock with teeth 120.

As can be seen from FIG. 4, if the cam lobe of switch 70 is located in a blocking position generally above the sensor pawl mechanism 64, the sensor-pawl mechanism will not move to its active position and hence the second locking mechanism 60 is blocked out. Alternatively, when the cam lobe 74 is moved away from the vehicle sensor pawl mechanism 64 the vehicle sensor 62 is operative to initiate the activation of the secondary locking mechanism 60 in response to dynamic crash conditions. From the above we see gear 82 will rotate in relation to the amount of webbing protracted from the spool.

As mentioned, the switch 70 comprises the disk 72, which includes a slot 130 (also shown in FIG. 5). The post 76 (of gear 82), which extends through slot 92 (on gear 90), is also received within slot 130 of disk 72. As gear 82 rotates its post slides within the slot 130 of disk 72. Additionally, as gear 82 rotates pin 76 orbitally rotates and pushes or pulls the disk 72 causing disk 72 to rotate about its rotary axis. As can be seen in FIG. 5 a pin 132 extends through components 72, 82 and 90 and also defines a rotational axis for these components. This pin 132 is loosely seated within housing 142 and rotates with the spool or torsion bar, which engages a hex shaped groove therein. Rotation of the pin 132 causes the gear 82 to rotate in a known manner.

By properly placing cam lobe 74 on its disk 72 and timing its movement relative to the other gears, and also by properly sizing the arc length of the cam lobe 74, the cam lobe 74 will be positioned atop (or near) the sensor-pawl mechanism 64 when the retractor is in its stored condition, that is, when the available seat belt webbing has been fully retracted onto the spool under the operation of the rewind spring 68. In this condition, the lock mechanism 60 is blocked out and cannot lock the spool and during an emergency only the first lock mechanism 40 is available to lock. Consequently, the energy-absorbing operation of the retractor is defined by the characteristics of the torsion bar.

As the seat belt webbing is protracted from the spool during the buckling-up operation, the various components of the switch mechanisms 66 and 70 rotate, causing the lobe 74 to slide relative to the sensor-pawl mechanism 64. The lobe 74 is sized to keep the sensor-pawl mechanism deactivated as long as the amount of seat belt webbing is below a first amount, this first amount corresponding to the amount of webbing typically used by a $5^{th}$ percentile adult.

After a larger amount of seat belt webbing has been protracted from the spool (this amount of seat belt webbing corresponding to the size of a 50th percentile male occupant) the lobe 74 will have moved to the position illustrated in FIG. 4 (displaced from the mechanism 64). This disengagement permits the vehicle sensor 62 to become operative and, as such, during an emergency, when the retractor 20 is in its ELR mode of operation, the vehicle secondary locking mechanism 60 will also lock the spool and prevent it from rotating. During an emergency the primary locking mechanism 40 will also lock the spool. Consequently, with both locking mechanisms active the torsion bar is prevented from rotating. As the occupant loads the seat belt the level of energy absorption is defined by the characteristics of the variable elongation seat belt (webbing).

Figure 6:
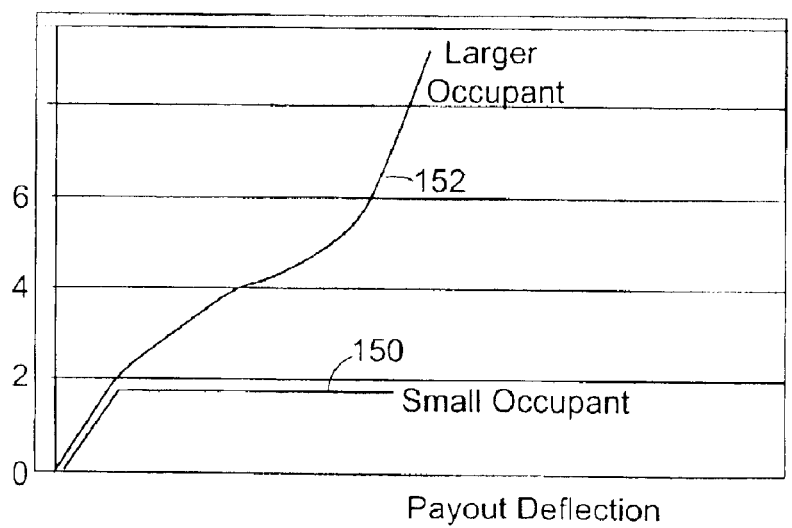
FIG. 6 represents a plurality of force displacement curves.

Reference is briefly made to FIG. 6, which illustrates the force displacement curves corresponding to the two energy-absorbing modes of operation for the retractor 20. Curve 150 shows the desired reaction force exerted on the seat belt 24 by the torsion bar 30 when only the primary locking mechanism 40 is activated (which activates only the torsion bar to protect the smaller occupant). The curve 152 shows the force displacement characteristic of the retractor, which is achieved when both primary and secondary locking mechanisms 40 and 60 are activated (for larger sized occupants). As mentioned above, this operatively removes the torsion bar 30 from the system and the resulting force displacement characteristic is primarily that of the variable elongation webbing 24.

As an aside, if a child seat were installed into the vehicle, the user of the child seat would have protracted most of the seat belt from the spool during the process of placing the seat belt about the child seat. As previously mentioned, this activity will switch the retractor to its ALR mode of operation in which the secondary side of the retractor is always locked. However, if the vehicle is involved in an emergency sufficient to active the vehicle sensor 42, then the first locking mechanism 40 will lock. The retractor 20 will revert to an energy-absorbing mode of operation for the child seat, which is defined by the variable elongation webbing.

Reference is again made to FIG. 5. The switch 70 can be configured so that the cam lobe 74 operates indirectly upon the sensor pawl mechanism 64. For example, due to the space available in the retractor the placement of the various components may be such that it may not be desirable or possible for the cam 74 to directly engage the sensor pawl mechanism 64. In this case the switch 70 can include a lever 140 that is rotatably supported in housing 142. The lever 140 can be biased by, for example, a switch spring 143. The axis of lever 140 is achieved by a pin 144 that is loosely fit within a receptacle 146 of the housing 142. The width of the lever is chosen to be sufficient in size such that the cam lobe 74 can engage the lever 140, thereby pushing the lever downwardly against the bias of spring 143. The lever 140 is also wide enough for the underside of the lever to press the sensor pawl mechanism 64 downwardly to indirectly deactivate the vehicle sensing mechanism 62.

Figure 7:
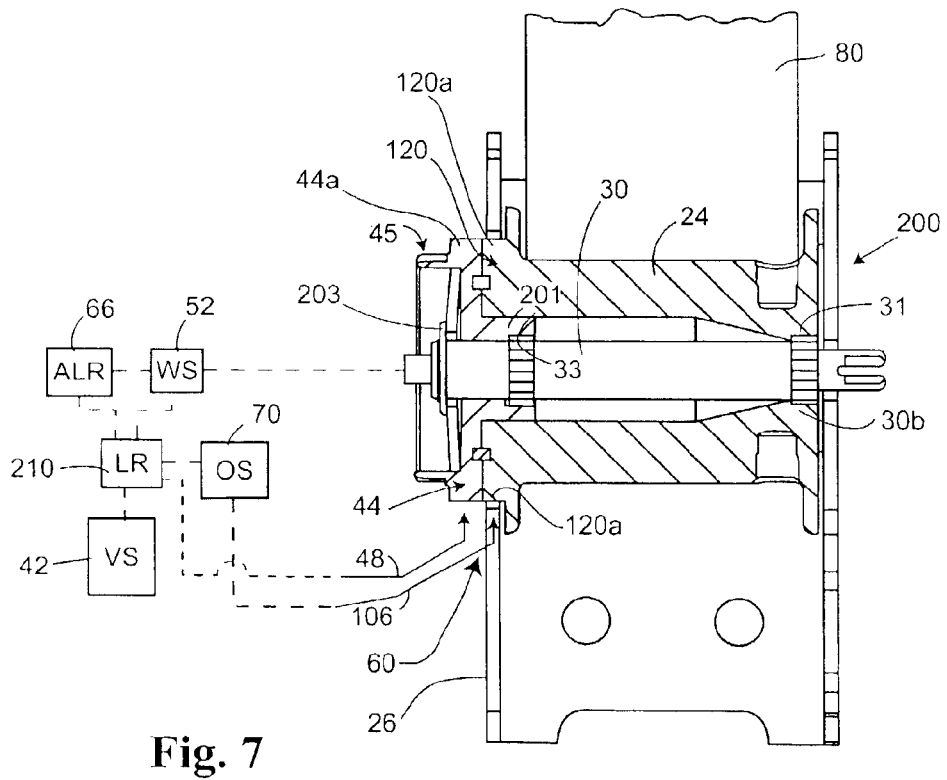
FIG. 7 diagrammatically shows an alternate embodiment of the invention.
Figure 8A:
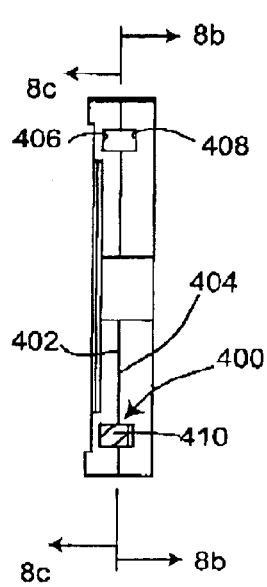
FIGS. 8a-c show various views of a torsion bar rotation counter mechanism.

Reference is made to FIGS. 7–8*a-c*, which illustrate an alternate embodiment of the invention. The retractor 200 has a number of ELR operating modes. When only the primary locking mechanism 40, comprising lock pawl 46, is active the retractor output is defined by the load-limiting characteristics of the torsion bar 30 as the spool 24 can rotate in response to occupant loads causing the torsion bar to twist. When secondary locking mechanism 60, including lock pawl 106, is also activated both the spool and the torsion bar are prevented from rotating and energy absorption (load limiting) is defined by the characteristics of the variable elongation seat belt webbing.

Retractor 200 can optionally include an ALR switch 66 if desired. Retractor 200 is designed to include an additional ELR mode of operation in which a torsion bar rotation counter mechanism 400 is used to remove the torsion bar from the system after the torsion bar has rotated a predetermined amount. After the torsion bar reaches this rotational limit, the load limiting reverts to that of the variable elongation seat belt webbing of the type generally shown in FIG. 3.

The torsion bar 30 and spool 24 are joined together at end 30*b* by a splined connection 31 in the manner shown in FIG. 1 enabling the spool to rotate with the torsion bar. The spool 24 includes a lock wheel 120, having teeth 120*a*, disposed on one side thereof and this lock wheel 120 is part of the secondary lock mechanism 60. The lock wheel 120 can be integrally formed as part of a cast or molded spool 24 or a hardened toothed ring can be secured to the spool, in a known manner.

The primary lock mechanism 40, as in FIG. 1, requires lock wheel 44 with teeth 44*a*. However, in this embodiment, the lock wheel 44 is located adjacent to the lock wheel 120, in contrast to being mounted on opposite ends of the spool 24 in the earlier embodiment. The lock wheel 44 is formed on or secured to the periphery of a cup-like wheel 45, which is used to house portions of the web sensor 52 and other parts of the locking mechanism (this feature is shown diagrammatically in the figures). The wheel 45 is connected to the torsion bar through the splined connection 33 and for example, connected at a cylindrical extension 201 of the wheel 45. The cylindrical extension acts as a bushing to rotationally support an end of the spool 24. The wheel 45 is held in place by a washer 203, which can be snapped to an end of the torsion bar 30. Associated with each of the lock wheels 44 and 120 are the lock pawls 48 and 106, which are shown schematically by arrows in FIG. 7 to avoid cluttering the figure.

As mentioned above, the first mode of operation is achieved by energizing the primary pawl 48, which locks wheel 45 and which effectively locks end 30*a* of the torsion bar 30. As the belt loads are communicated to the torsion bar through the spool 24 the torsion bar is able to rotate, absorbing or limiting the belt load applied to the occupant as the torsion bar rotates. As before, this torsion bar mode of operation will be entered into when the user is of a size that is smaller than (or equal to) that of the 50th percentile male. During this mode of operation the secondary locking mechanism 60, which includes pawl 106, is locked out or blocked out of operation by the incorporation of a switch 70.

As also mentioned above, in the second ELR mode of operation, after a sufficient amount of webbing has been removed from the spool, the switch 70 will have been moved away from the appropriate sensor pawl and the secondary pawl 106 is free to be activated, thereby preventing the lock wheel 120 (and spool 24) from rotating. As can be seen, this mode of operation forces both ends 30*a* and 30*b* of the torsion bar to remain in phase and the torsion bar cannot twist. As such, the output characteristic of the locked retractor 200 is defined by the characteristic of the seat belt webbing 28, which in this embodiment, and as with the earlier embodiment, is a variable elongation webbing.

The retractor 200 also includes web sensor 52, the ALR switch 66 and the occupant size switch 70, which blocks out or retards the operation of the secondary locking mechanism 60 when occupants of a larger stature use the retractor. The web sensor and ALR switch cause the lock ring or lock cup 210 (see FIG. 7) to rotate, which activates one or the other of the primary or secondary pawl 48 and 106. As can be seen, this embodiment only utilizes a single vehicle sensor, which is operatively coupled to the lock ring or lock cup 210. As with the earlier embodiment, when the web sensor and/or the vehicle sensor couple the lock ring 210 to the shaft of the retractor 200, that is couple the lock ring to the torsion bar 30, the lock ring 210 rotates with the torsion bar to move the primary lock pawl 48 into its mating teeth 44*a*.

Figure 8C:
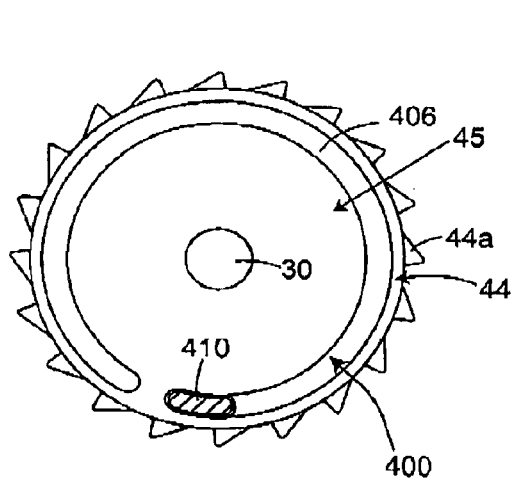
Figure 8B:
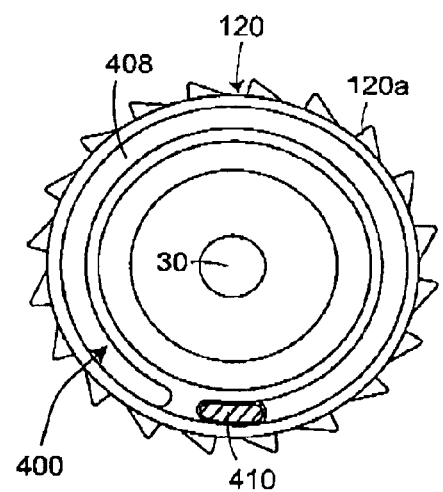

Reference is briefly made to FIGS. 8*a-c*, which illustrate the details of the torsion bar rotation (twisting) counter mechanism 400, which provides the additional mode of operation. This mechanism 400 (which is also referred to as a rotation counter or counter) uses portions of the wheel 45 and the spool 24. The adjacent faces 402 and 404 of the wheel 45 and the spool 24 each include a respective groove 406 and 408 respectively. Located within each groove 406 and 408 and spanning these grooves, is a pin 410. As illustrated the pin is oblong in shape. When the primary locking mechanism 40 is activated and after the belt loads increase, the spool and torsion bar begin to turn. As the spool turns the faces 402 and 404 rotate relative to each other. As the spool rotates it carries the pin 410 with it, and the pin slides within the relatively moving grooves 406 and 408. When the pin reaches the end of the grooves the spool 24 is prevented from rotating further relative to the wheel 45. This stopping of the spool prevents the torsion bar from twisting further, which effectively removes the torsion bar from the system. Any further increase in belt load will be reacted against by the variable elongation webbing 80.

Figure 9:
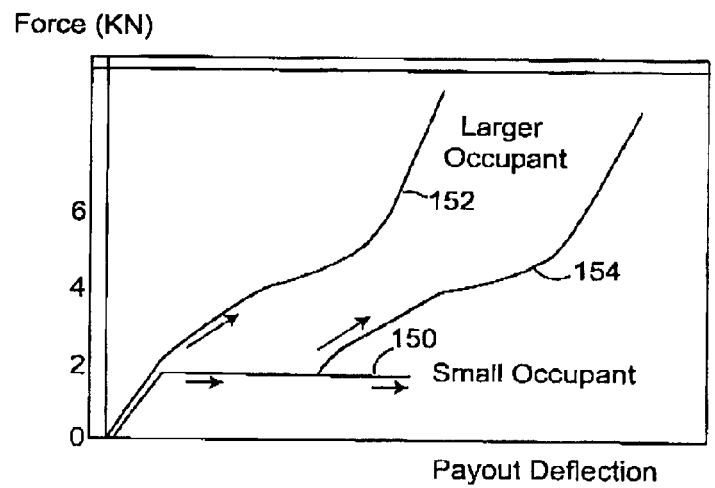
FIG. 9 shows the belt loads generated with the retractor of FIG. 7.

Reference is briefly made to FIG. 9. Curve 150 shows the load limiting (energy absorption) in the primary mode of operation with the torsion bar. In this mode of operation a predetermined amount of webbing has been removed from the spool as the smaller occupant buckles-up. With regard to curve 154, if however, the conditions of the accident are such that the smaller occupant has loaded the seat belt sufficiently to cause the torsion to twist significantly, then after a predetermined amount of such torsion bar twisting the torsion bar will become operatively disabled and the energy absorbing characteristics of the retractor will be defined by the more robust characteristics of the variable elongation webbing. Curve 152 shows the load limiting resulting with both locking mechanisms locked in which case energy absorbing is defined by the characteristics of the variable elongation webbing.

Figure 10:
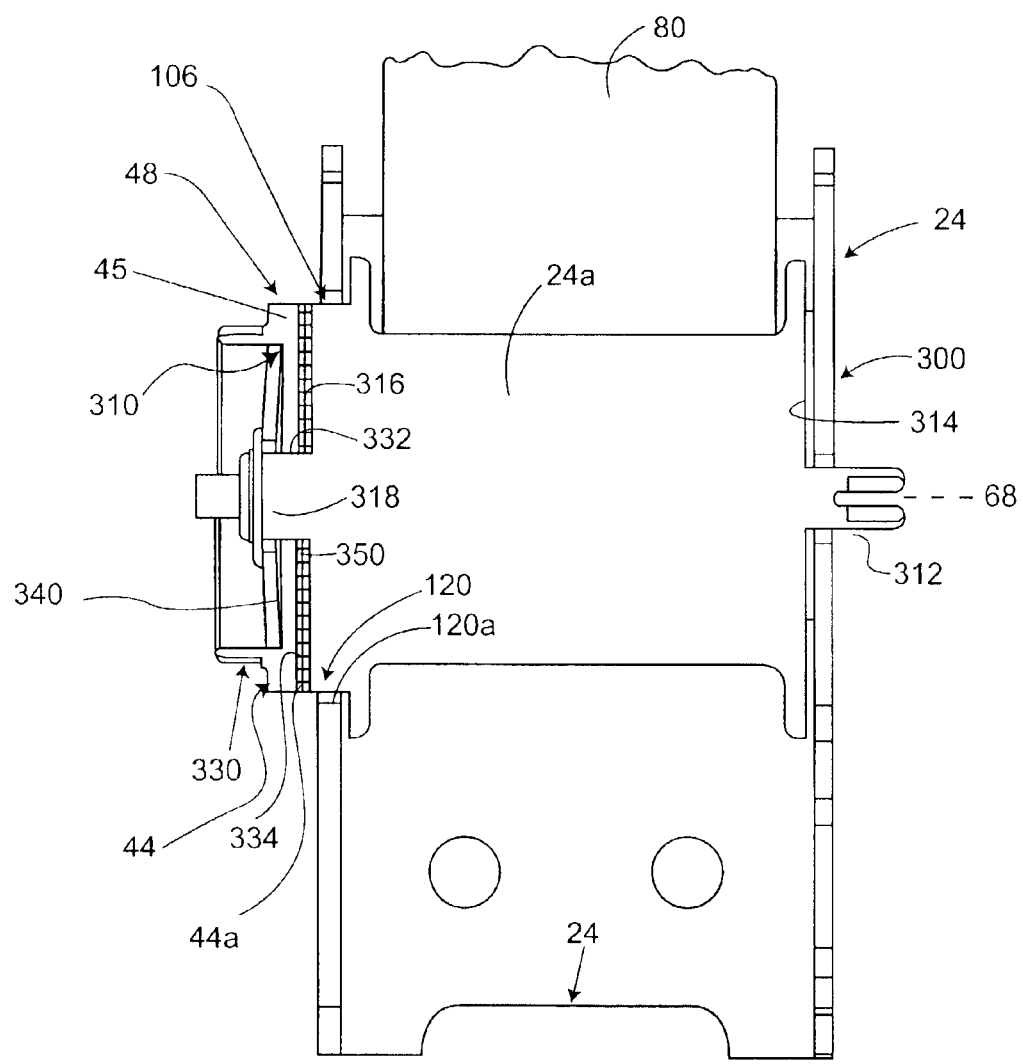
FIG. 10 illustrates an alternate embodiment of the invention.

Reference is now briefly made to FIG. 10, which illustrates an alternate seat belt retractor 300, which also exhibits two levels of energy absorption or dissipation. A first level is defined by the characteristics of the seat belt webbing 80. The second level is defined not by a torsion bar but by a friction brake or clutch mechanism, generally shown as 310. The various levels of energy absorption are achieved as before by selectively activating one of two locking mechanisms. The friction level of the brake or clutch is chosen to be compatible with the levels of load limiting achieved by the torsion bar 30, as shown in curve 150 above (see FIG. 6). The retractor 300 includes spool 24a, which need not include a hollow passage used for receipt of a torsion bar in the earlier embodiments. The spool need not be solid but can include voids for weight reduction. The spool 24a, however, includes a stub axle 312, which extends from a side face 314 of the spool 24a. The spool 24a includes a second face 316 generally opposite face 314. Extending from that face is a post 318. The post 318 acts as a guide for the friction mechanism 310.

The primary lock mechanism 40 comprises a generally circular cup 330 (similar to cup 45 of retractor 200) having a recess 332 for receipt of the post 318. The exterior surface of the cup 334 defines an end face that is complementary to face 316 of the spool. A Belville washer 340 is operatively connected to the post 318 and provides a biasing force to continually bias the face 334 against (or at least towards) face 316.

In general each of the opposing faces 316 and 334 can operate as friction surfaces as they move relative to one another. Either or both of the faces 316 and 334 can be uncovered in which case the surface finish or choice of material will define the level of friction that can be generated therebetween. However, one or both faces can be covered with or receive a friction material generally shown as 350 in order to achieve the desired friction, energy absorbing, characteristic.

The primary lock wheel 44 is connected to or made part of the cup 330 while the secondary lock wheel 120 is associated with the spool 24a (in the same manner as done with retractor 200). To effect the mode of operation for the relatively small sized occupant, the primary pawl 48 (shown diagrammatically by an arrow) is activated, which locks the cup 330 in place. As the spool 24a is rotated by the forces exerted on the seat belt (webbing) 80, a friction force is generated at the interface of the faces 316 and 334 (or at the interface of the friction material 350 if used). The load-limiting characteristic in this mode of operation is chosen to achieve a friction characteristic similar to the energy-absorbing characteristic shown by curve 150 above.

The surfaces 316 and 334 can react directly or, as mentioned above, one or both of these surfaces can support disks of friction material such as conventional clutch disk material or vehicle brake friction pad material. Since in this embodiment the primary and secondary lock wheels are mounted adjacent one another, the locking mechanisms, that is the vehicle sensor, ALR switch, counter or vehicle size switch 70, can use those discussed in the earlier embodiments.

Figure 11:
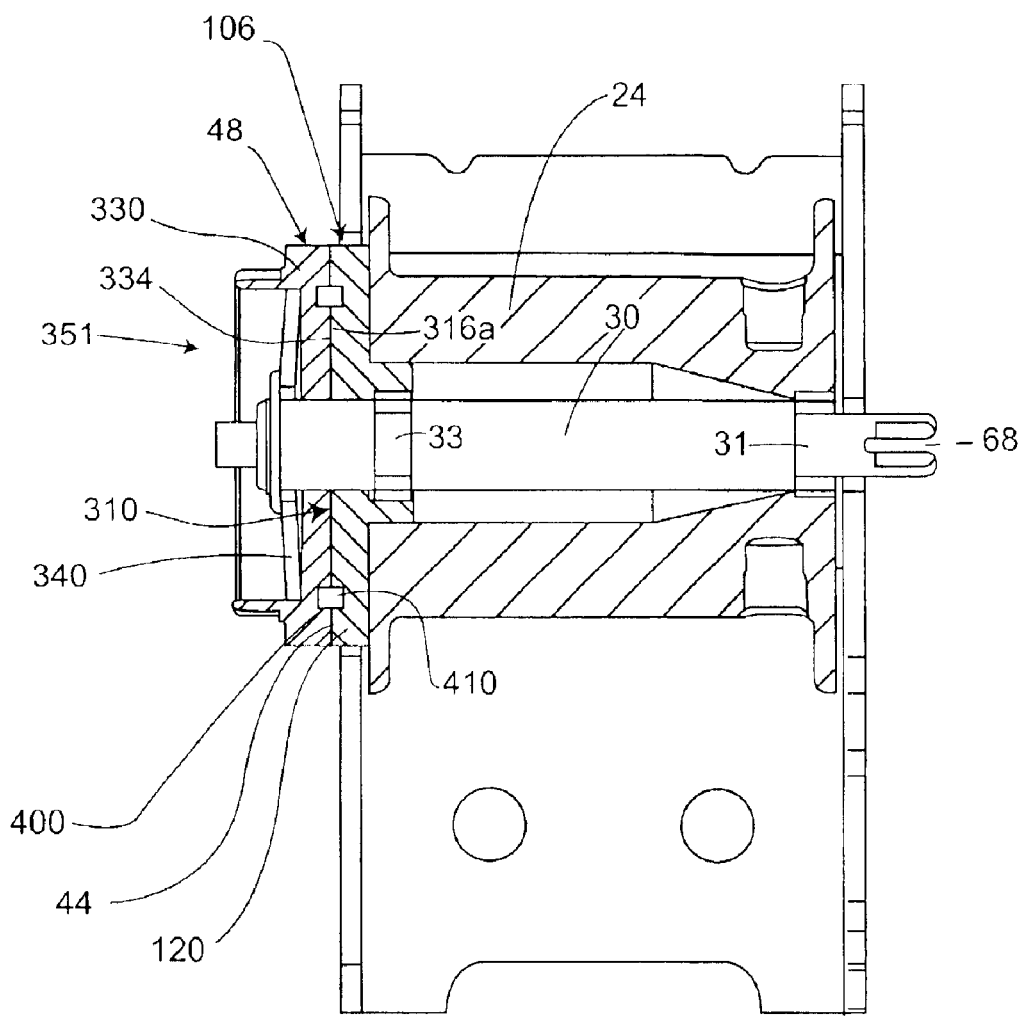
FIG. 11 shows another embodiment of the invention.
Figure 11A:
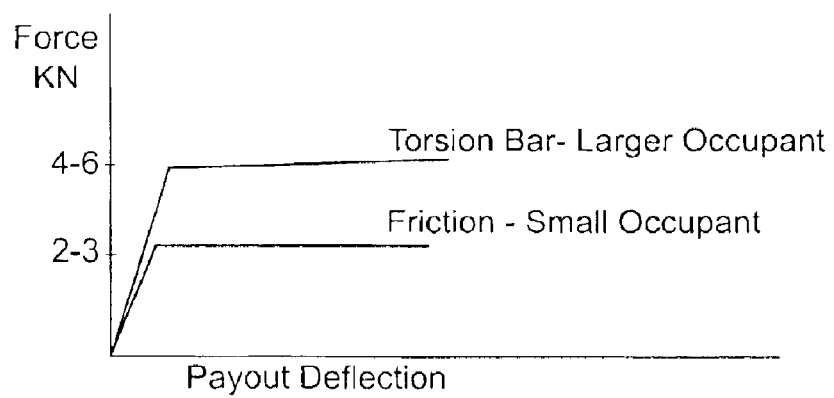
FIG. 11a schematically shows friction and torsion bar load curves.

Reference is made to FIG. 11, which shows a further embodiment of the invention and one in which retractor 351 utilizes the friction clutch mechanism 310 as well as a torsion bar 30. In the preferred embodiment, the webbing is a conventional seat belt webbing and not a variable elongation seat belt webbing. In this embodiment when the primary lock mechanism is activated the load limiting of the retractor is defined by the friction characteristics of the mechanism 310; this mode is used for smaller occupants under control of the switches 70 and/or 66. For larger occupants both the primary and secondary locking mechanisms are activated and as the spool is loaded the spool 24 rotates the torsion bar 30. In this embodiment load limiting is defined by the characteristics of the torsion bar 30, which is set higher than the load limiting achievable by the friction mechanism 310 (see FIG. 11a).

In this embodiment the torsion bar extends through spool 24 (as it did in FIG. 1). As before, the torsion bar is connected via a splined connection 31 to one end of the spool 24. As belt load is applied to the spool 24, the spool will rotate as the spool twists. In this embodiment the secondary lock wheel 120 is connected to the torsion bar 30 through a splined connection 33. The friction surface 316 that was previously realized by a face 316 of the spool is now realized by a comparable face 316a of the lock wheel 120. The mechanism for development of torsion forces between the friction mechanism 310 and the lock wheel 120 is the same as described for retractor 300 and includes another friction surface 334.

As can be seen, the primary and secondary lock pawls 48 and 106 are shown schematically relative to the primary and secondary lock wheels 44 and 120. By the selective activation of one or both of the pawls, the desired operational mode of the retractor can be achieved. If both locking pawls are activated, that is, if both the primary and the secondary locking mechanisms 40 and 106 are activated the respective lock wheels 44 and 120 are fixed relative to one another. However, since the spool is free to rotate and twist the torsion bar, load absorption (load limiting) will be defined by the characteristics of the torsion bar 30. If however only the primary lock mechanism 40 (pawl 48) is activated, only the wheel 330 is rotationally fixed (relative to the retractor frame).

In this mode of operation the friction level between faces 334 and 316a is chosen relatively low so that torques applied through the spool will cause the spool, torsion bar and lock wheel 120 to rotate in unison. This rotation causes the relative rotation of the friction faces 316a and 334 thereby generating the frictional load-limiting (energy absorbing) characteristic.

This embodiment can also optionally include mechanism 400, which is used as a switch to change the output load-limiting characteristic of the retractor from the lower friction level to the higher level attainable by the chosen torsion bar. More specifically, mechanism 400 will permit the lock wheel 120 to rotate a predetermined amount while the lock wheel 120 rotates relative to the friction surface 334. After these surfaces have rotated to the limit, pin 410 can no longer slide in the facing grooves 406 and 408 and the wheel 330 is physically connected to the lock wheel 120.

Thereafter any added rotation of the spool is reacted against by the torsion bar. For example, in this embodiment the load limiting achieved by the friction mechanism can be set at about 3 kN (in a range between 2–3 kN) while the torsion bar load limit level can be set to 6 kN (in a range between 4–6 kN). These levels can be achieved by change in friction material and change in the mechanical parameters of the torsion bar.

Many changes and modifications in the above-described embodiment of the invention can, of course, be carried out without departing from the scope thereof. Accordingly, that scope is intended to be limited only by the scope of the appended claims.

What is claimed is:

1. A seat belt retractor (20) comprising:
    a primary (40) and secondary (60) locking mechanism and deactivation means (70, 72, 74) for mechanically deactivating the second locking mechanism if the retractor is used by occupants not in a designated class:
    the retractor including at least two load limiting mechanisms (30, 80, 350) configured to be selectively employed depending on the size of the occupant;
    wherein the deactivating means includes a mode switching switch (65), sensitive to the amount of seat belt which is one of a) remaining on the spool and b) removed from the spool, to operatively switch between the two load limiting mechanisms.

2. The retractor as defined in claim 1 wherein the at least two load-limiting mechanisms includes a combination of a torsion bar and a variable elongation seat belt webbing.

3. The retractor as defined in claim 2 wherein the load-limiting capability of the torsion bar is generally configured to be less than that of the variable elongation seat belt webbing.

4. The retractor as defined in claim 2 wherein the primary and secondary locking mechanisms are operatively associated with each side of a retractor spool, and wherein the primary and secondary locking mechanisms are configured on the retractor to operatively block out the torsion bar when both locking mechanisms are activated and to permit the operation of the torsion bar when the primary locking mechanism is activated.

5. The retractor as defined in claim 1 wherein the at least two load-limiting mechanisms includes a combination of a friction generating mechanism and a variable elongation seat belt webbing.

6. The refractor as defined in claim 5 wherein the load-limiting capability of the friction gen rating mechanism is generally configured to be less than that of the variable elongation seat belt webbing.

7. The retractor as defined in claim 1 wherein the at least two load-limiting mechanisms includes a combination of a torsion bar and a friction generating mechanism.

8. The retractor as defined in claim 7 wherein the load-limiting capability of the friction generating mechanism is generally configured to be less than that of the torsion bar.

9. The retractor as defined in claim 1 including an ALR switch operatively associated with the secondary locking mechanism.

10. The retractor as defined in claim 9 wherein the deactivation means is driven by the ALR switch.

11. The retractor as defined in claim 1 wherein the deactivation means includes a rotating disk (72) including a lobe (74) configured to prevent activation of an inertial sensor associated with the secondary locking mechanism.

12. The retractor as defined in claim 11 wherein the ALR switch includes a wobble gear which moves about a ring gear, the wobble gear including a pin (76), and wherein the wobble gear includes a slot (130), radially positioned through the disk, to receive the pin (76) wherein the pin (130) rotationally advances the disk and also moves in a relative manner, radially in the slot.

13. The retractor as defined in claim 11 including an intermediate lever (140) operated upon by the lobe (74) and movable into engagement with a component of the secondary looking mechanism.

14. The retractor as defined in claim 1 wherein the mode switching switch (65) includes a gear driven lobe movable from a blocking position in which it prevents the secondary locking mechanism from entering into a locked mode of operation and movable to a disengaged positron in which the lobe is disassociated from the secondary locking mechanism.

15. The retractor as defined in claim 1 further including limit means for limiting the rotation of the torsion bar to a fixed number of turns, whereby when the torsion bar has been so rotated, the load-limiting characteristic of the retractor is defined by the load-limiting characteristics of the variable elongation webbing.

16. A seat belt retractor (20) comprising:
    a primary (40) and secondary (60) looking mechanism and deactivation means (70, 72, 74) for mechanically deactivating the second locking mechanism if the retractor is used by occupants not in a designated class;
    the retractor configured to operate in a default mode of operation, using the load-limiting characteristics of a torsion bar when less than a first amount of seat belt webbing has been withdrawn from a spool of the retractor with only the primary locking mechanism operative during an emergency;
    the retractor further configured to operate in a second mode of operation using all load-limiting characteristics of a variable elongation seat belt webbing after more than the first amount of seat belt webbing has been withdrawn from the spool of the retractor with both the primary and secondary locking mechanisms operative during an emergency.

* * * * *